United States Patent
Chigusa

(10) Patent No.: US 9,047,543 B2
(45) Date of Patent: Jun. 2, 2015

(54) INFORMATION PROCESSING DEVICE, INFORMATION PROCESSING METHOD, AND COMPUTER PROGRAM PRODUCT

(71) Applicant: Yoshinari Chigusa, Kanagawa (JP)

(72) Inventor: Yoshinari Chigusa, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

(21) Appl. No.: 14/478,569

(22) Filed: Sep. 5, 2014

(65) Prior Publication Data

US 2015/0077769 A1    Mar. 19, 2015

(30) Foreign Application Priority Data

Sep. 13, 2013    (JP) .................................. 2013-190721

(51) Int. Cl.
| | |
|---|---|
| *G06F 15/00* | (2006.01) |
| *G06K 1/00* | (2006.01) |
| *G06K 15/10* | (2006.01) |
| *G06K 15/02* | (2006.01) |
| *H04L 29/08* | (2006.01) |
| *G06K 15/00* | (2006.01) |

(52) U.S. Cl.
CPC .............. *G06K 15/021* (2013.01); *H04L 67/10* (2013.01); *G06K 15/4065* (2013.01)

(58) Field of Classification Search
CPC ... G06K 15/021; G06K 15/4065; H04L 67/10
USPC .......................................... 358/1.1, 1.15, 1.9
See application file for complete search history.

(56) References Cited

U.S. PATENT DOCUMENTS

| | | | |
|---|---|---|---|
| 6,628,420 B2 * | 9/2003 | Seike et al. ..................... | 358/1.2 |
| 2004/0085439 A1 * | 5/2004 | Takaki .......................... | 347/247 |

FOREIGN PATENT DOCUMENTS

| | | |
|---|---|---|
| JP | 09-185606 | 7/1997 |
| JP | 2002-283644 | 10/2002 |
| JP | 2006-260307 | 9/2006 |
| JP | 2010-143167 | 7/2010 |

* cited by examiner

*Primary Examiner* — Douglas Tran
(74) *Attorney, Agent, or Firm* — Oblon, McClelland, Maier & Neustadt, L.L.P.

(57) ABSTRACT

A designating unit designates any of three edge faces other than an edge face corresponding to a spine of a book-bound article generated by a printer. A generating unit generates a bitmap corresponding to the designated edge face depending on a bookbinding condition. A rendering unit renders a first image designated by a user on the bitmap. A specifying unit specifies, among pieces of line data respectively corresponding to dots forming a first side parallel to a paper thickness direction and that each extend parallel to a second side orthogonal to the first side, in the bitmap, line data corresponding to an object page to be printed. An adding unit adds a second image to a place corresponding to the dots of the first image included in the specified line data, on a third side indicating a side of the object page corresponding to the specified line data.

12 Claims, 18 Drawing Sheets

INFORMATION PROCESSING DEVICE, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2013-190721 filed in Japan on Sep. 13, 2013.

BACKGROUND OF THE INVENTION

1. Field of the Invention

The present invention relates to an information processing device, an information processing method, and a computer program product.

2. Description of the Related Art

Conventionally, there has been known a technique for printing a book-bound article in which a plurality of printed matters are collected. For example, Japanese Laid-open Patent Publication No. 2002-283644 discloses a printer system related to magazine binding.

However, the conventional technique fails to print character strings, graphics, and images on three edge faces (the top face, the side face, and the bottom face) other than the edge face corresponding to the spine of a book-bound article. Such printing requires special printers such as a silk-screen printer, for printing after a book-bound article is generated.

Therefore, there is a need for an information processing device, an information processing method, and a computer program product capable of printing a predetermined image on an edge face of a book-bound article without requiring special printers.

SUMMARY OF THE INVENTION

According to an embodiment, an information processing device includes a designating unit, a generating unit, a rendering unit, a specifying unit, an adding unit, and an output unit. The designating unit designates at least one of three edge faces other than an edge face corresponding to a spine of a book-bound article generated by a printer. The generating unit generates a bitmap corresponding to the edge face designated by the designating unit depending on a bookbinding condition. The rendering unit renders a first image designated by a user on the bitmap. The specifying unit specifies, from among a plurality of pieces of line data that correspond on a one-to-one basis to a plurality of dots forming a first side parallel to a paper thickness direction and that each extend parallel to a second side orthogonal to the first side, in the bitmap, line data corresponding to an object page that indicates a page to be printed. The adding unit adds a second image to a place that corresponds to the dots of the first image included in the specified line data, on a third side that indicates a side of the object page corresponding to the specified line data. The output unit outputs a print job including the object page to which the second image is added to the printer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an information processing device, an information processing method, and a computer program in accordance with the present invention are described in detail below with reference to the accompanying drawings.

Figure 1:
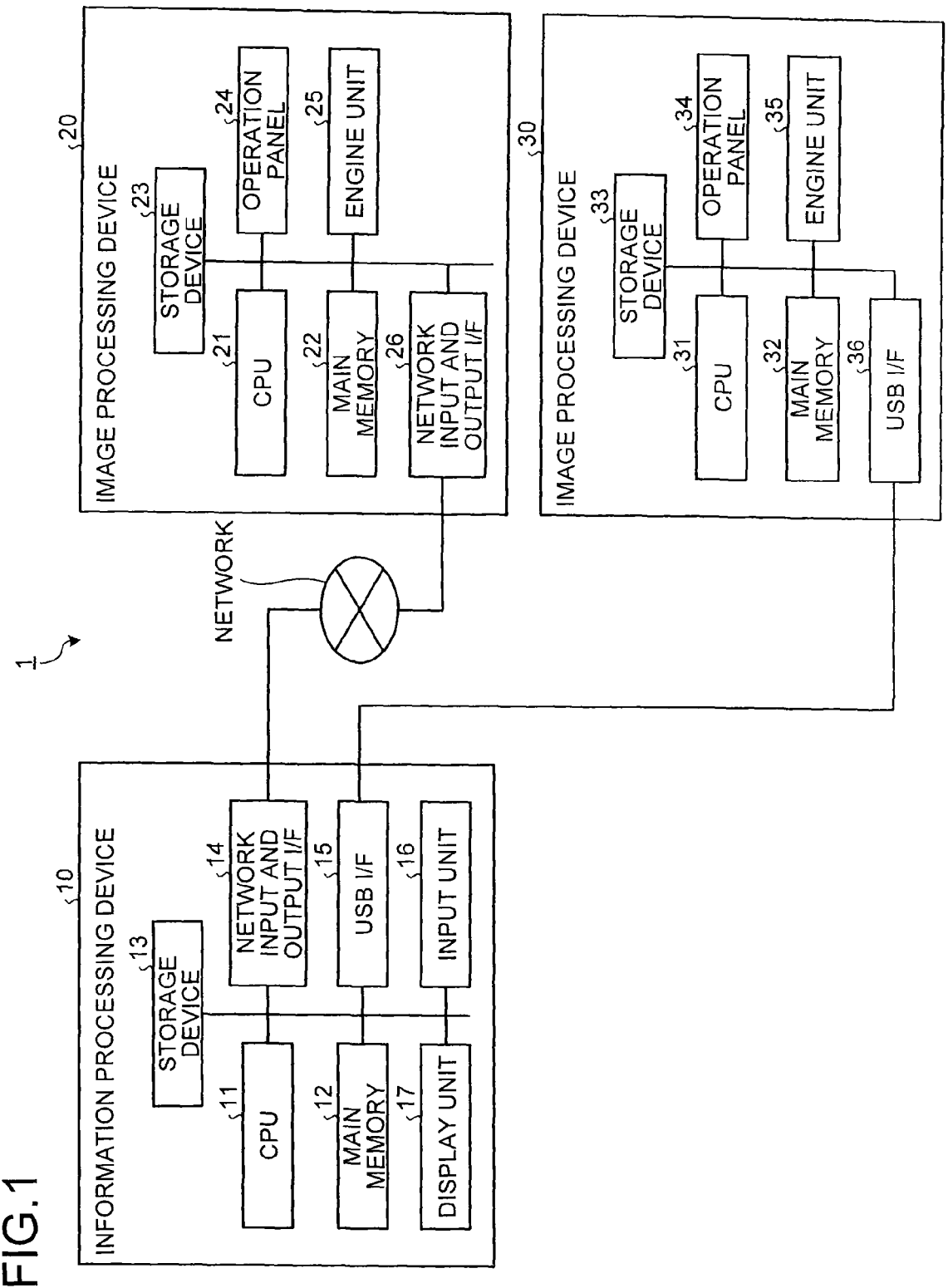
FIG. 1 is a view illustrating an example of the hardware configuration of an image forming system according to embodiments of the present invention.

FIG. 1 is a view illustrating one example of the hardware configuration of an image forming system 1 according to the present embodiments. The image forming system 1 includes an information processing device 10, an image processing device 20, and an image processing device 30 as illustrated in FIG. 1. In this example, the information processing device 10 can communicate with the image processing device 20 via a network such as the Internet. The information processing device 10 can communicate with the image processing device 30 via a serial bus (communication line) of the universal serial bus (USB) standard. The number of image processing devices with which the information processing device 10 can communicate is not limited to two.

The information processing device 10 is formed of, for example, a personal computer (PC), and includes a central processing unit (CPU) 11, a main memory (main storage device) 12, a storage device 13, a network input and output interface (I/F) 14, a universal serial bus interface (USB I/F) 15, an input unit 16, and a display unit 17. The CPU 11 uses the main memory 12 as a work area, and executes a computer program stored in the storage device 13, etc., so as to control an operation of the whole information processing device 10. The main memory 12 is a volatile memory acting as a work area, and can be formed of, for example, random-access memory (RAM). The storage device 13 is a memory for storing therein software such as an application, an operating system (OS), and a printer driver, and can be formed of, for example, a hard disk drive (HDD), flash read-only memory (Flash ROM), a USB memory, and a combination thereof. The network input and output I/F 14 is an interface for performing input and output through a network. The USB I/F 15 is an interface for connecting with a serial bus of the USB standard.

The input unit 16 is a device for allowing a user to perform various kinds of input, and can be formed of, for example, a keyboard and a mouse. The display unit 17 is a device for displaying various kinds of information, and can be formed of, for example, a liquid crystal display (LCD). The display unit 17 may be formed of, for example, a touch panel with a function of receiving input from a user. In other words, the display unit 17 may also have a function of the input unit 16.

In the example of FIG. 1, the image processing devices 20 and 30 are formed of a multifunction peripheral (MFP) capable of achieving various kinds of functions such as printer, copier, scanner, and facsimile functions, and correspond to a "printer" according to claims. The image processing device 20 includes a CPU 21, a main memory 22, a storage device 23, an operation panel 24, an engine unit 25, and a network input and output I/F 26 as illustrated in FIG. 1. The CPU 21 uses the main memory 22 as a work area, and executes a computer program stored in the storage device 23, etc., so as to control an operation of the whole image processing device 20. The main memory 22 is a volatile memory acting as a work area, and can be formed of, for example, random-access memory (RAM). The storage device 23 is a memory for storing therein software that provides the various kinds of functions (such as printer, copier, scanner, and facsimile functions), and can be formed of, for example, an HDD, Flash ROM, a USB memory, and a combination thereof.

The operation panel 24 displays various kinds of information while receiving various kinds of input corresponding to operations of a user. In this example, the operation panel 24 is formed of an LCD with a touch panel function, but is not limited to this. The operation panel 24 may be formed of, for example, an organic electroluminescence (EL) display with a touch panel function.

The engine unit 25 is hardware for achieving printer, copier, scanner, facsimile functions, and other functions. The engine unit 25 includes, for example, a scanner for scanning and reading a document, a plotter for printing on a sheet member such as paper, and a facsimile unit for performing facsimile communication. Moreover, the engine unit 25 can have specific options including a finisher for sorting a printed sheet member and an automatic document feeder (ADF) for automatically feeding a document.

The network input and output I/F 26 is an interface for performing input and output through a network.

The image processing device 30 is different from the image processing device 20 in that it includes a USB I/F 36 instead of the network input and output I/F 26. The USB I/F 36 is an interface for connecting with a serial bus of the USB standard. The other configuration is similar to that of the image processing device 20. When no distinction is made between the image processing devices 20 and 30, they, hereinafter, may be referred to simply as "image processing device".

Figure 2:
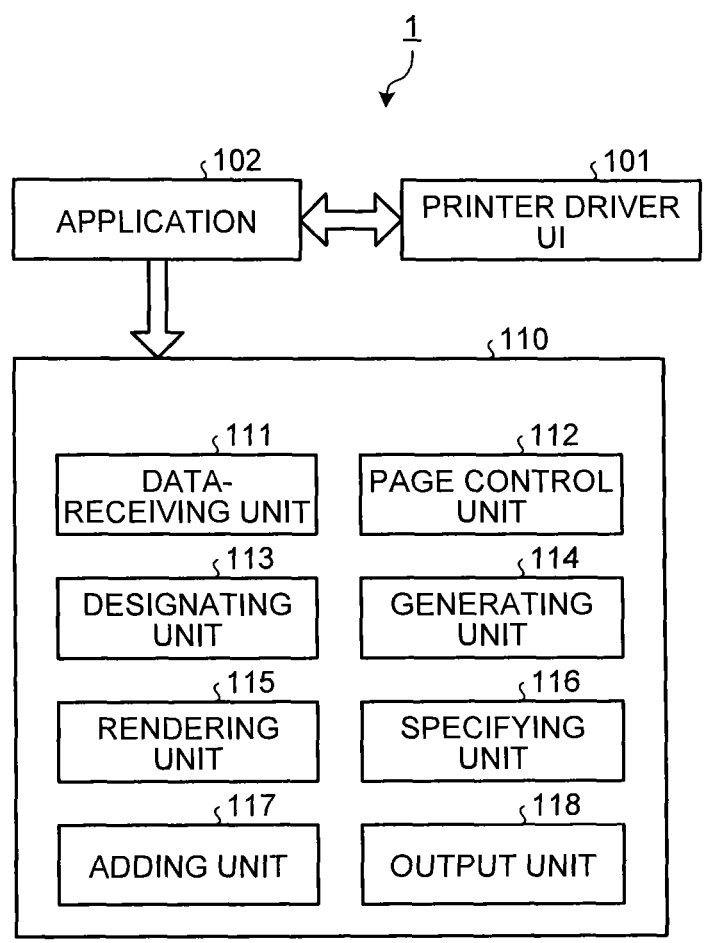
FIG. 2 is a view illustrating an example of the software configuration of an information processing device.

The following describes the software configuration of the information processing device 10 with reference to FIG. 2. FIG. 2 is a view illustrating one example of the software configuration of the information processing device 10. FIG. 2 mainly illustrates functions related to the present invention for convenience of explanation, but the functions of the information processing device 10 are not limited to those.

The information processing device 10 includes a printer driver user interface (UI) 101, an application 102, and a printer driver 110 as illustrated in FIG. 2. The printer driver UI 101 has a function of receiving set input of bookbinding conditions that indicate conditions of bookbinding printing. The bookbinding conditions include information for designating, for example, a printing method, a type of paper, and a binding method. In this example, the printer driver 110 receives bookbinding printing information including the bookbinding conditions received by the printer driver UI 101 and print data, from the application 102.

The printer driver 110 includes a data-receiving unit 111, a page control unit 112, a designating unit 113, a generating unit 114, a rendering unit 115, a specifying unit 116, an adding unit 117, and an output unit 118 as illustrated in FIG. 2. The data-receiving unit 111 receives the above-mentioned bookbinding printing information from the application 102. The page control unit 112 lays out pages (layout processing) for the print data included in the bookbinding printing information so that pages are aligned in the order at the time of binding sheets of paper into a book based on the bookbinding conditions. The following describes the case where the bookbinding conditions indicate that sheets of paper are bound into a book with single-sided printing as an example.

Figure 3:
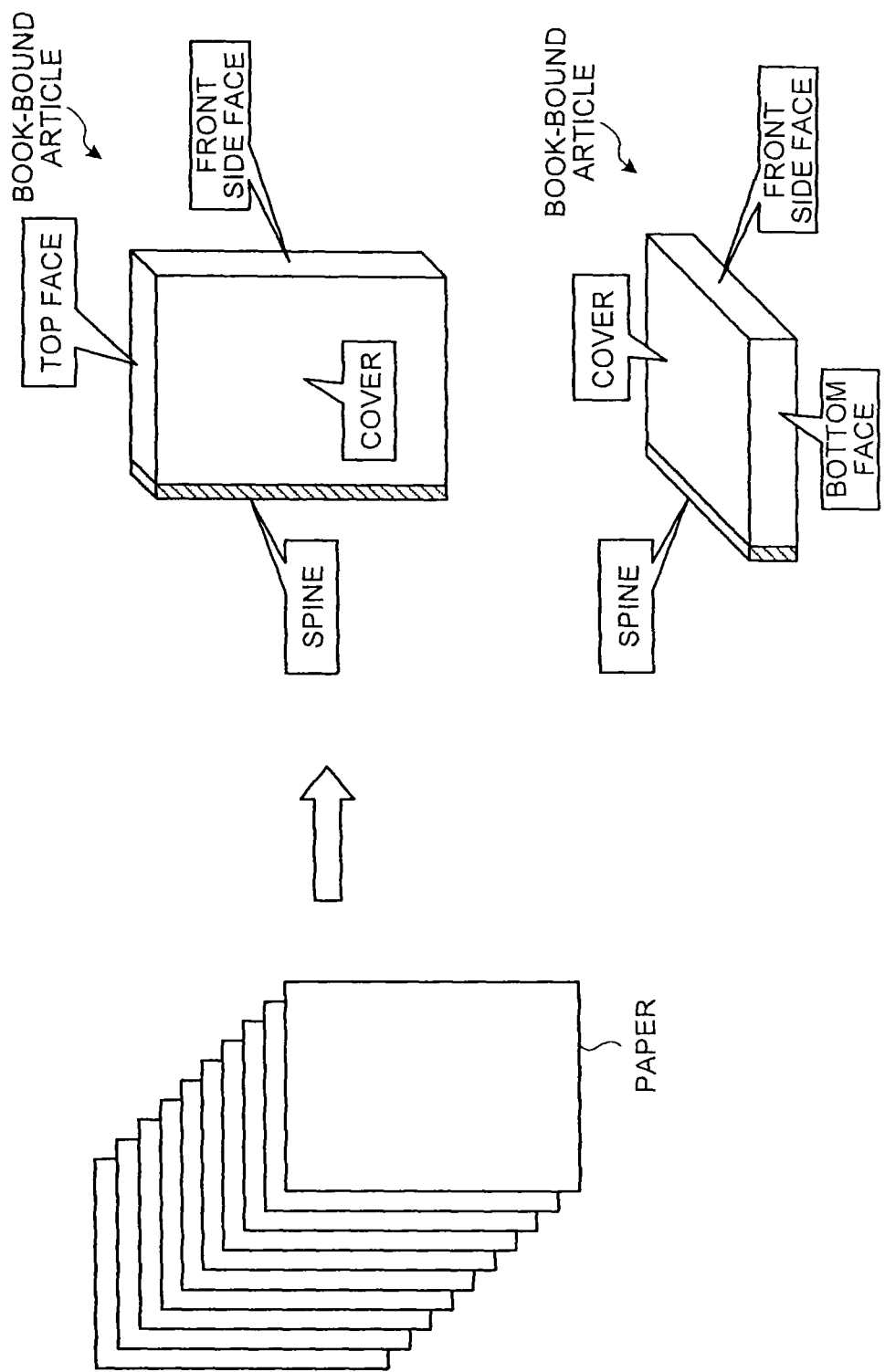
FIG. 3 is a view illustrating an example of the case where sheets of paper are bound into book with single-sided printing.

The designating unit 113 designates at least one of the three edge faces (the top face, the front side face, and the bottom face) other than the edge face corresponding to the spine of a book-bound article generated by the image processing device, for example, depending on input from a user via the printer driver UI 101. When sheets of paper are bound into a book with the single-sided printing as illustrated in FIG. 3, sheets of paper subjected to the single-sided printing are collected so as to obtain a book-bound article. Examples of binding directions include left opening, right opening, upward opening, and downward opening, and any of the binding directions is designated based on the bookbinding conditions. In the example of FIG. 3, it is aimed to emerge a first image designated by a user on any of the three edge faces (the top face, the front side face, and the bottom face) other than the edge face corresponding to the spine in a book-bound article, and the user, therefore, performs input indicating at least one of the top face, the front side face, and the bottom face. The designating unit 113 designates at least one of the top face, the front side face, and the bottom face (can designate two or more faces) according to the input from a user.

The generating unit 114 illustrated in FIG. 2 generates a bitmap corresponding to the edge face designated by the designating unit 113 depending on the bookbinding conditions. When the bookbinding conditions specify that the type of paper is A4 (210 mm×294 mm), the total number of pages is 1,000, the paper thickness is 0.5 mm/sheet, the printing method is single-sided printing, and the binding method is long-side binding, and the resolution is 600 dpi, for example, the generating unit 114 generates bitmaps (which can be regarded as a canvas with a plurality of dots arranged in matrix) as illustrated in FIG. 4.

Figure 4:
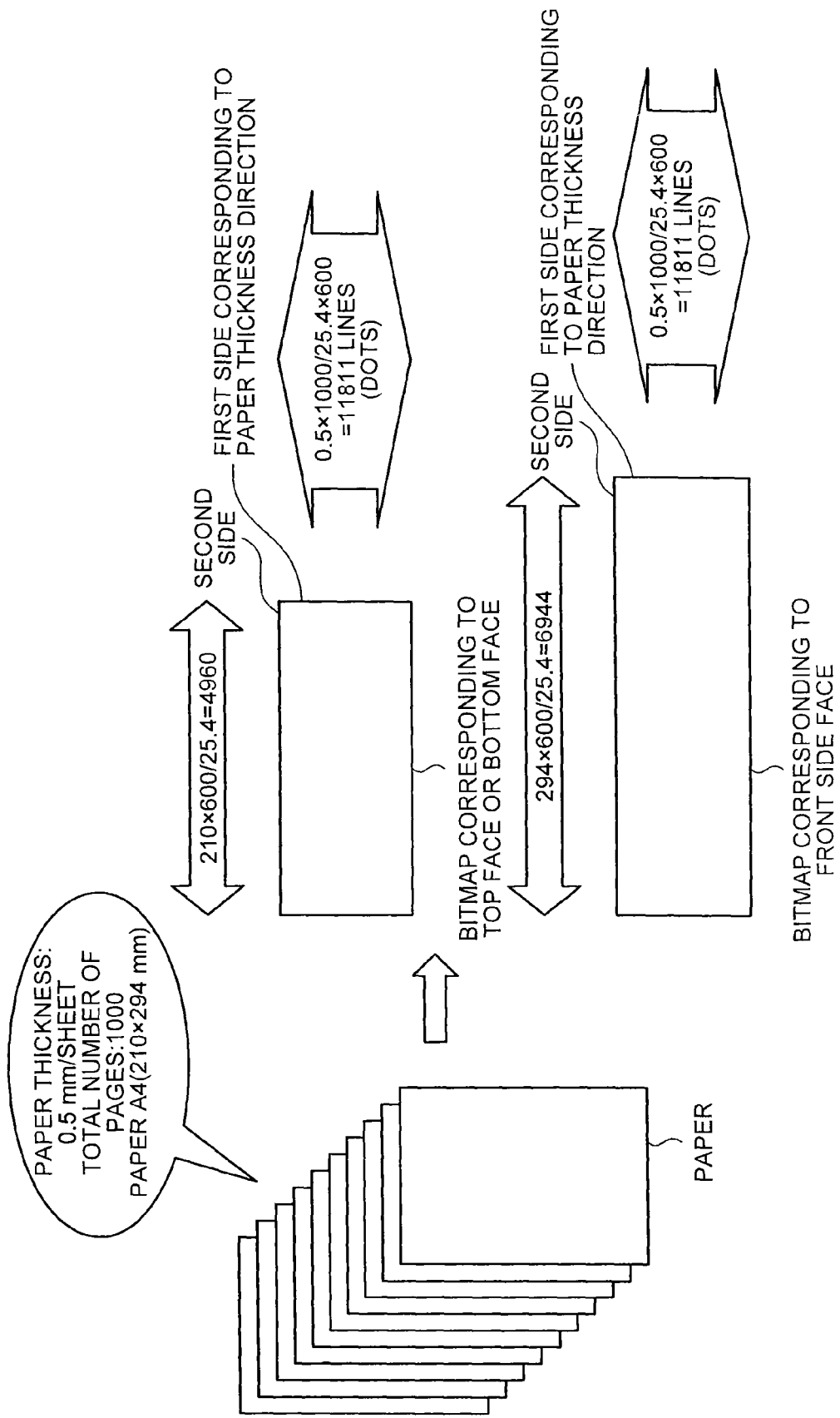
FIG. 4 is a view illustrating one example of bitmaps.

As illustrated in FIG. 4, in the bitmap corresponding to the top face or the bottom face, a first side corresponding to a paper thickness direction has 0.5×1,000/25.4×600=11,811 dots (lines), and a second side orthogonal to the first side has 210×600/25.4=4,960 dots. In the bitmap corresponding to the front side face, a first side has 0.5×1,000/25.4×600=11,811 dots (lines), and a second side orthogonal to the first side has 294×600/25.4=6,944 dots.

The rendering unit 115 illustrated in FIG. 2 renders the first image designated by a user on the bitmap generated by the generating unit 114. The following describes the case where the first image is a character string of "ABC" as an example. In this example, the rendering unit 115 renders an image of the character string of "ABC" on the bitmap generated by the generating unit 114. Any image can be used for the first image, and the first image, for example, may be character strings representing an index of a dictionary or may be a character string for security such as "Confidential". The first image is not limited to an image of character strings, and may be an image that represents, for example, graphics or pictures.

The specifying unit 116 specifies, from among a plurality of pieces of line data that correspond on a one-to-one basis to a plurality of dots forming the first side and that each extend parallel to the second side in the bitmap generated by the generating unit 114, the line data corresponding to an object page that indicates a page to be printed. More specifically, the specifying unit 116 specifies the line data corresponding to an object page based on the total number of pages, the number of object pages, and the total number of line data (hereinafter may be referred to as "the total number of lines") in the book-bound article. For further detail, the specifying unit 116 specifies, for each page to be printed (object page), the line data corresponding to the page based on the following expression 1.

Figure 5:
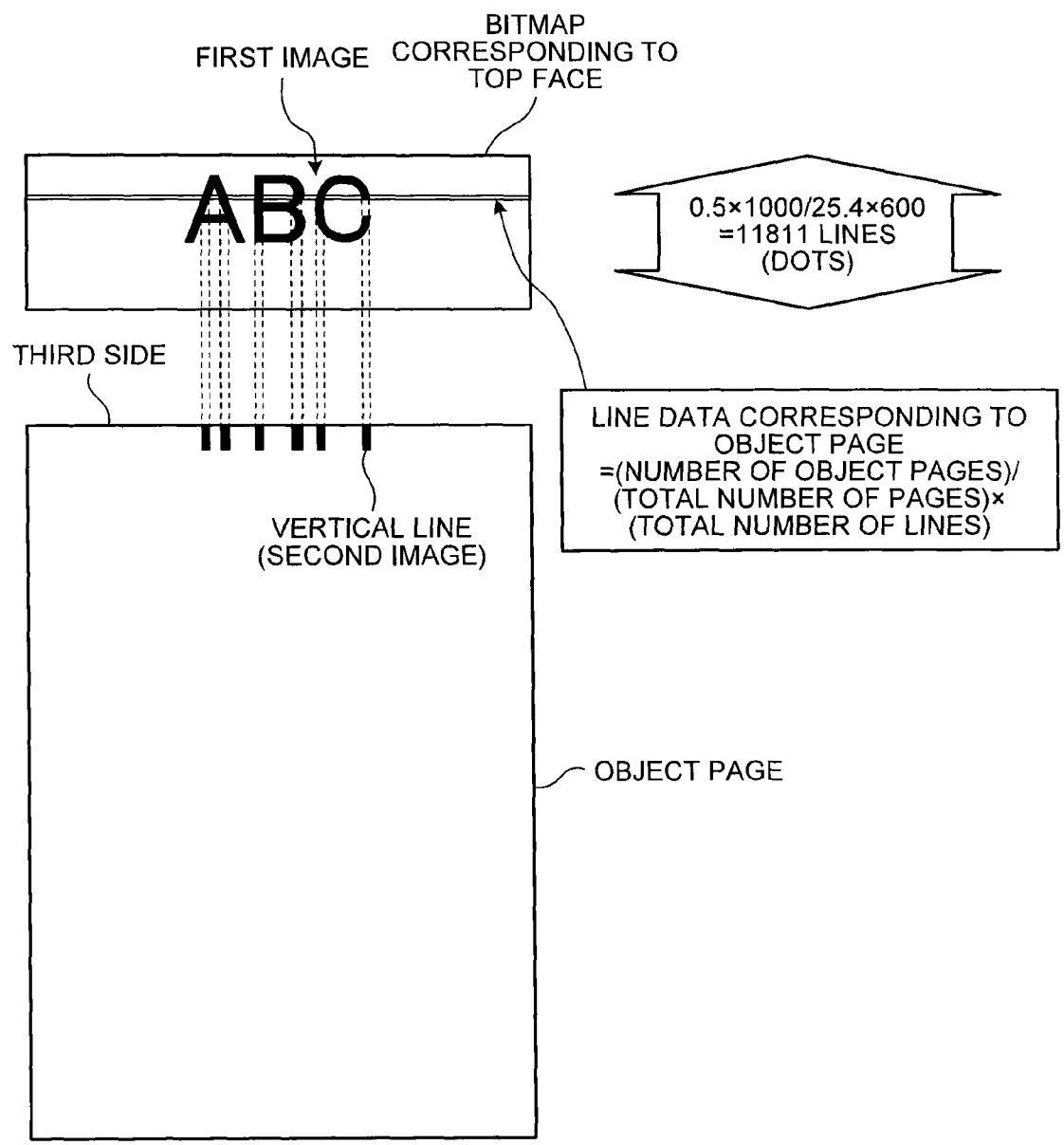
FIG. 5 is a schematic view illustrating a state in which a second image is added to a dot position on an object page.

Line data corresponding to an object page=(the number of object pages)/(the total number of pages)× (the total number of lines)  Expression 1:

The adding unit 117 adds a second image to a place (hereinafter may be referred to as "dot position") that corresponds to the dots of the first image included in the line data specified by the specifying unit 116, on a third side that indicates a side of the object page corresponding to the line data. In the present embodiment, the second image is straight lines (hereinafter may be referred to as "vertical lines") extending in a direction orthogonal to the third side, but is not limited to this. FIG. 5 is a schematic view illustrating a state in which the second image of vertical lines is added to the dot position on the third side (upper side in this example) of the object page when the first image of the character strings "ABC" is rendered on the bitmap corresponding to the top face designated by the designating unit 113.

Figure 6:
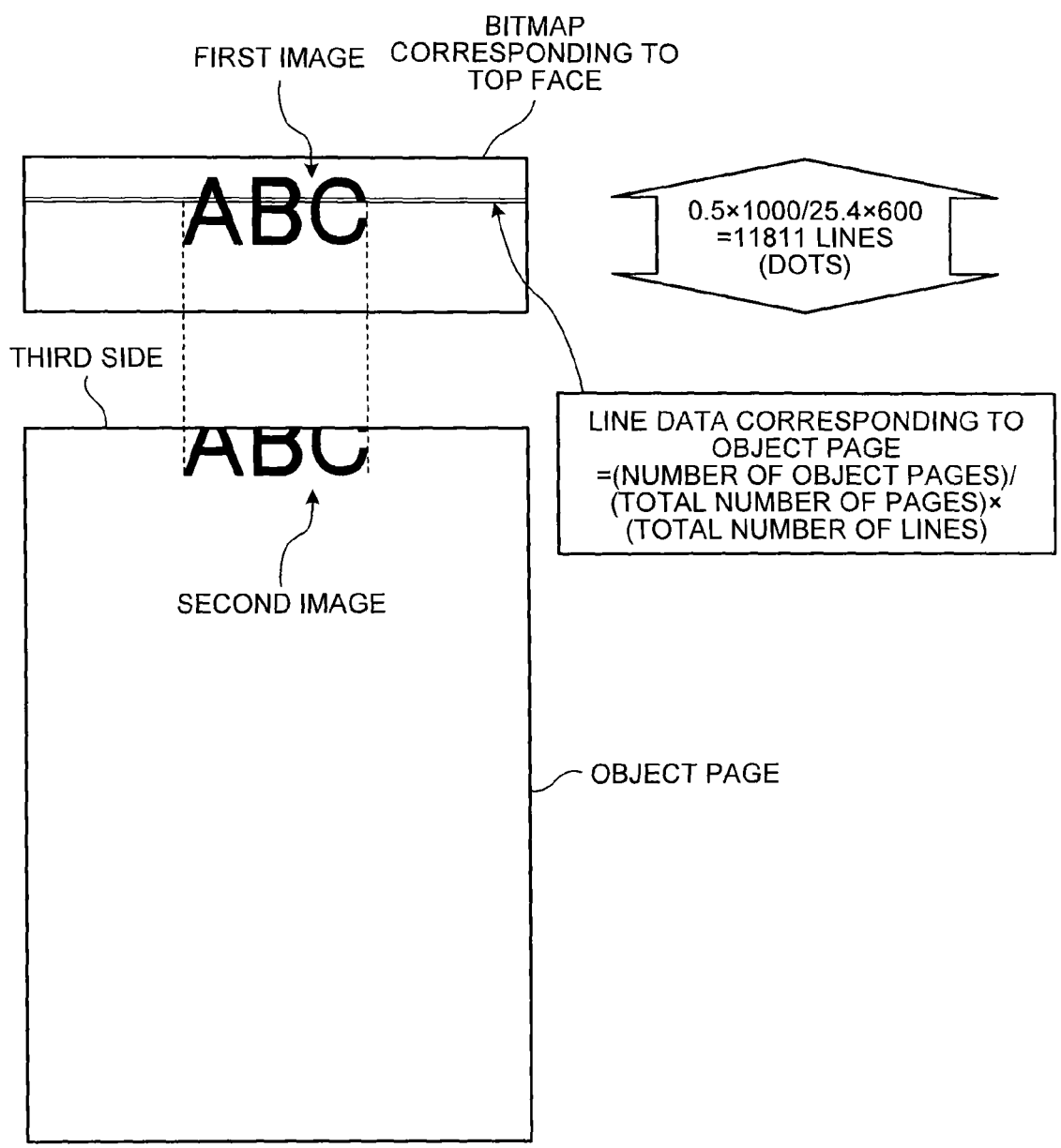
FIG. 6 is a schematic view illustrating a state in which a second image of a modification is added to a dot position on an object page.

For example, as disclosed in FIG. 6, the second image may illustrate a part of the first image below the line data specified by the specifying unit 116. This embodiment can also obtain the same effect (effect of making the first image printed on an edge face indelible) as the case where the second image is the vertical lines is added.

Figure 7:
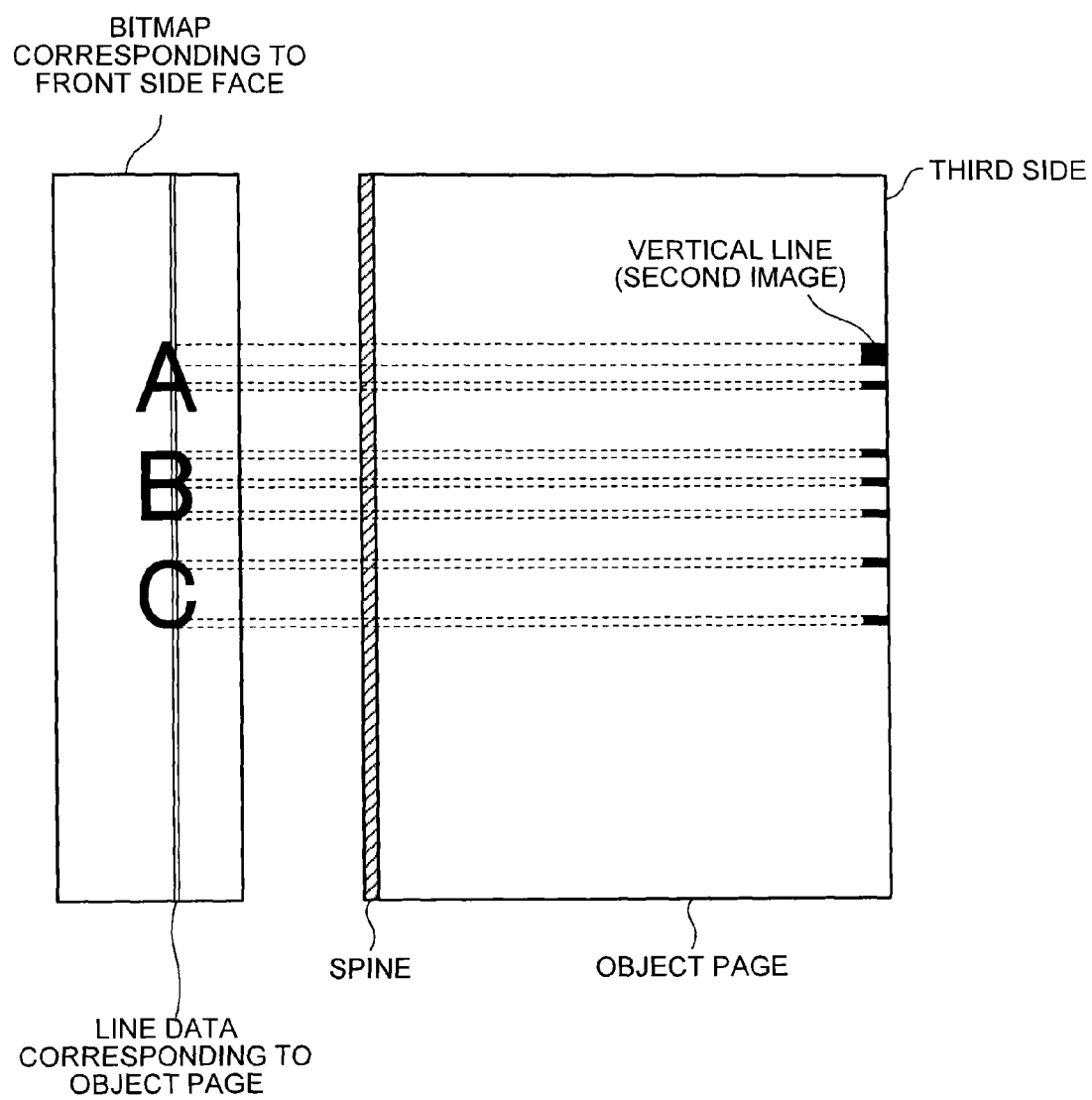
FIG. 7 is a schematic view illustrating a state in which a second image is added to a dot position on an object page.

FIG. 7 is a schematic view illustrating a state in which the second image illustrating vertical lines is added to a dot position on the third side (right side in this example) of the object page when the first image illustrating character strings "ABC" is rendered on the bitmap corresponding to the front side face designated by the designating unit 113.

The output unit 118 illustrated in FIG. 2 generates a print job including the object page to which the second image is added, and outputs (transmits) the generated print job to the image processing device. The image processing device having received the print job from the information processing device 10 performs printing (bookbinding printing) based on the received print job.

Figure 8:
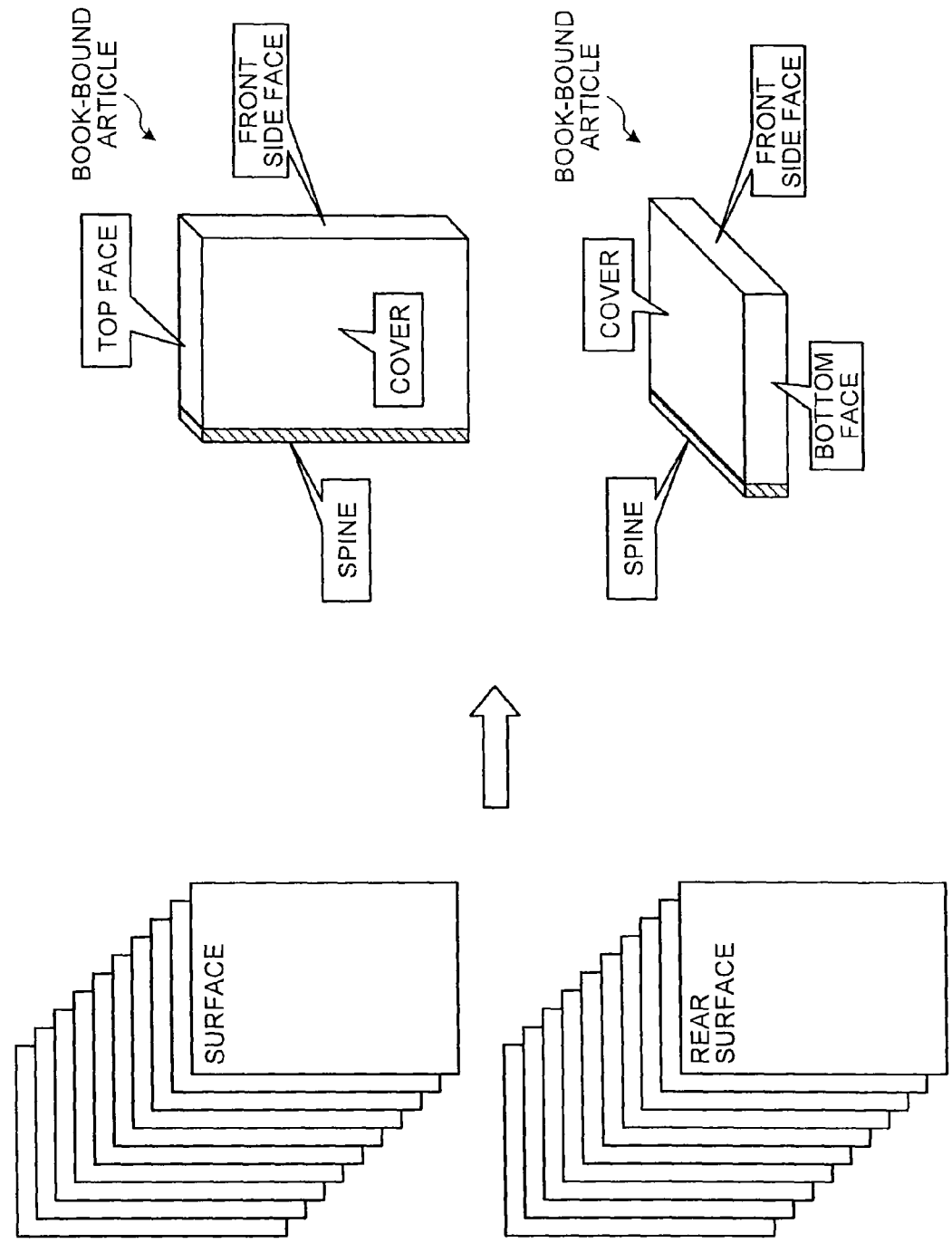
FIG. 8 is a view illustrating an example of the case where sheets of paper are bound into a book with duplex printing.
Figure 9:
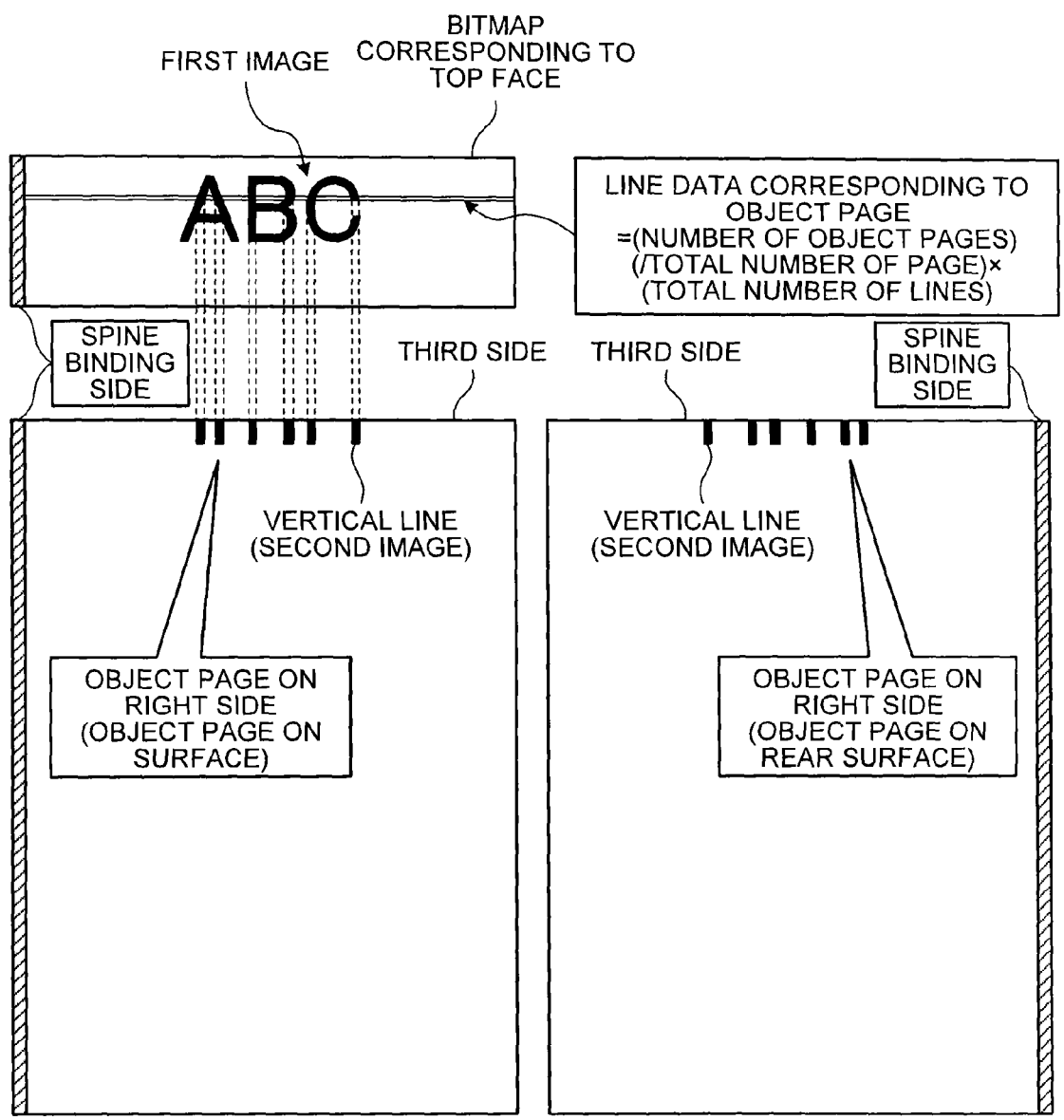
FIG. 9 is a schematic view illustrating a state in which second images are added to dot positions on object pages.

The above describes the case where the bookbinding conditions indicate that sheets of paper are bound into a book with the single-sided printing as an example, but the bookbinding conditions may indicate that sheets of paper are bound into a book with duplex printing, for example, as disclosed in FIG. 8. In this case, examples of binding directions include left opening, right opening, upward opening, and downward opening. FIG. 9 illustrates the case where the bookbinding conditions indicate that sheets of paper are bound into a book with the duplex printing, and is a schematic view illustrating a state in which the second images of vertical lines are added to dot positions on the third sides of object pages when the first image of a character string "ABC" is rendered on the bitmap corresponding to the top face designated by the designating unit 113. As illustrated in FIG. 9, the position relation between the dot position on the third side of the object page on the surface and the dot position on the third side of the object page on the rear surface is a position relation where left and right are reversed (relation of a mirror position).

Figure 10:
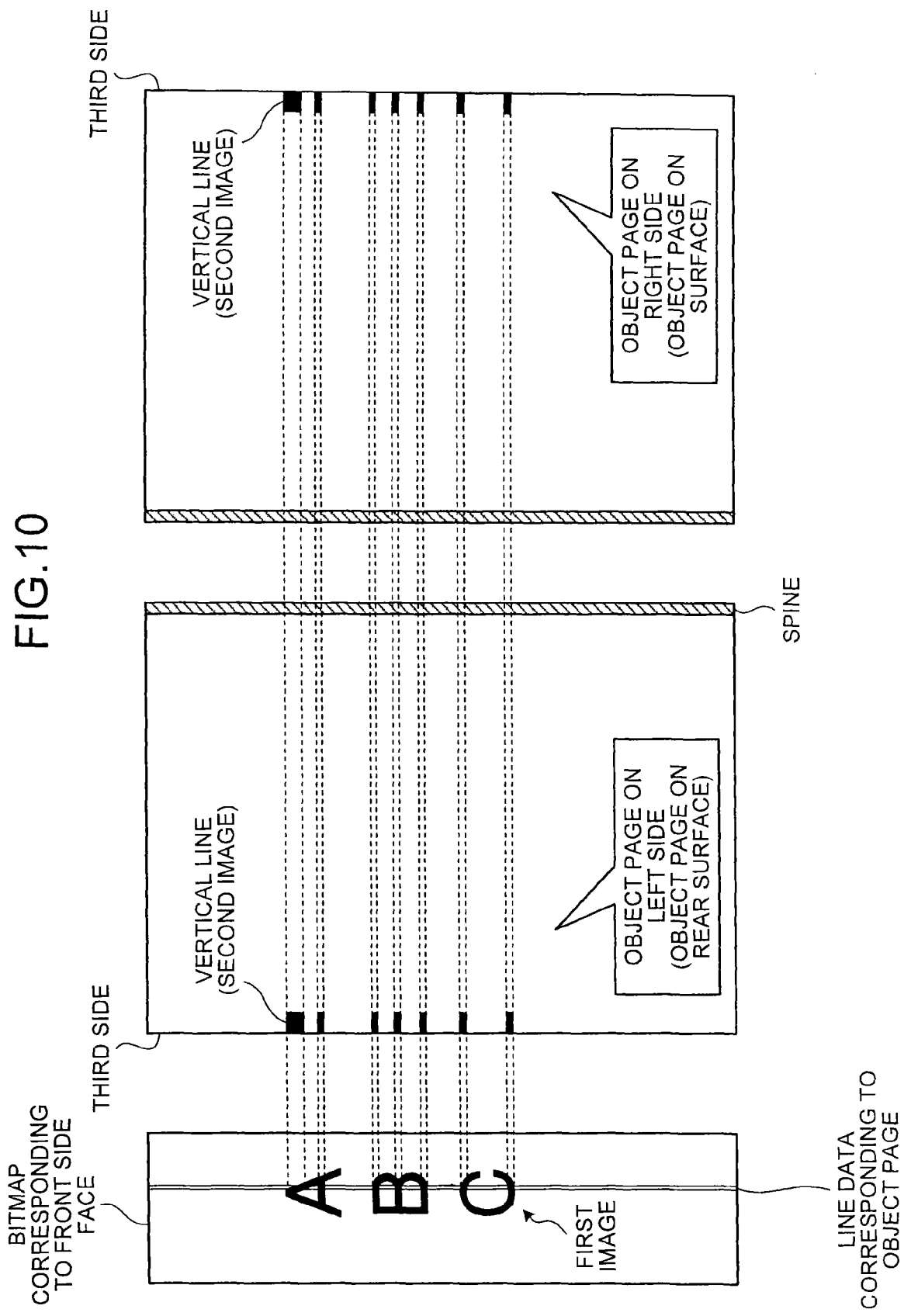
FIG. 10 is a schematic view illustrating a state in which second images are added to dot positions on object pages.

FIG. 10 illustrates the case where the bookbinding conditions indicate that sheets of paper are bound into a book with the duplex printing, and is a schematic view illustrating a state in which the second images of vertical lines are added to dot positions on the third sides of object pages when the first image of a character string "ABC" is rendered on the bitmap corresponding to the front side face designated by the designating unit 113. As illustrated in FIG. 10, the third side of the object page on the surface is a side (right side) opposite to the binding side of a page, and the second image of vertical lines is added to a place (dot position) corresponding to the dots of the first image included in the corresponding line data, whereas the third side of the object page on the rear surface is a side (left side) opposite to the binding side of the page, and the second image of vertical lines is added to the same position as the object page on the surface.

Figure 11:
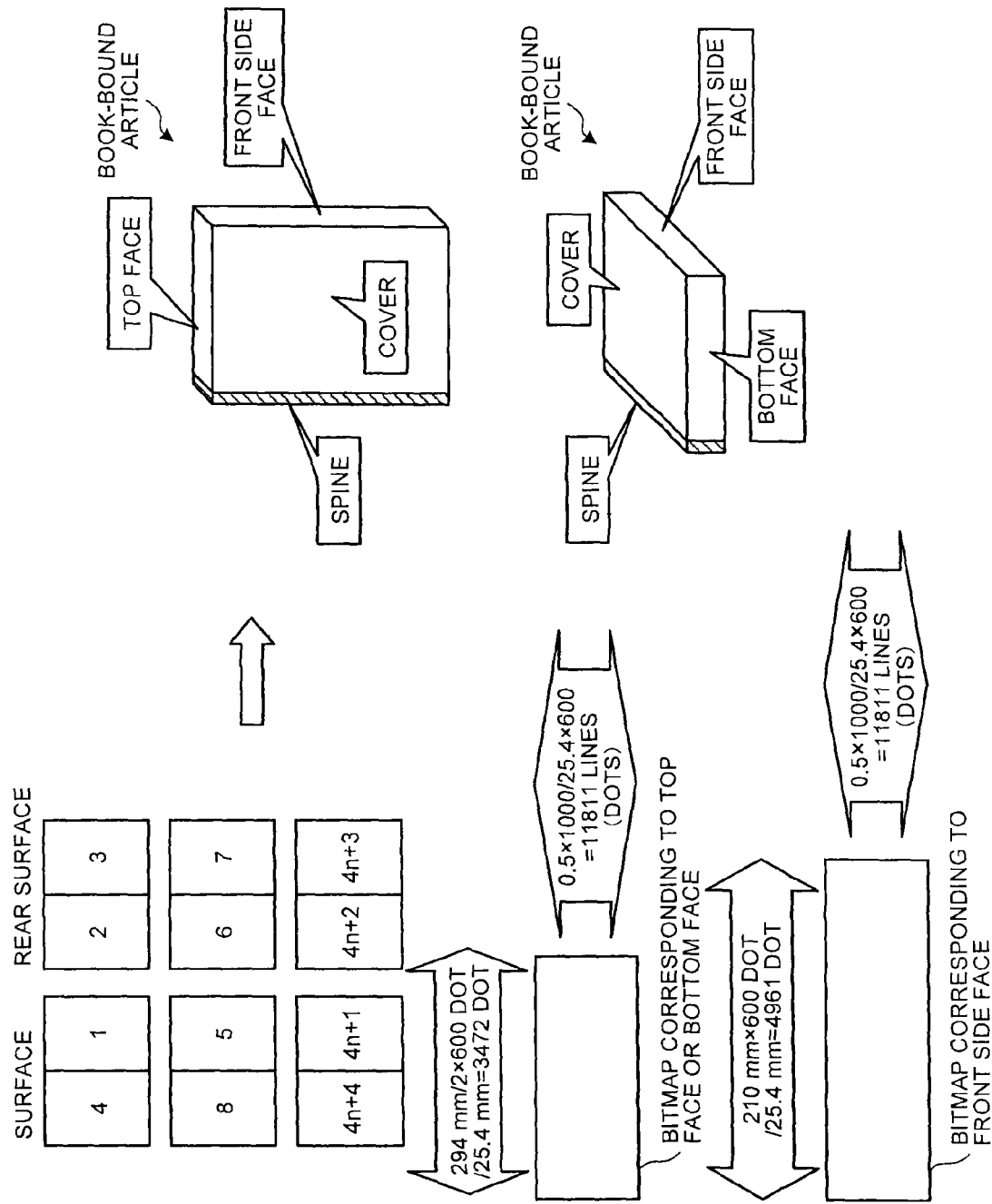
FIG. 11 is a view illustrating an example of the case where sheets of paper are bound into a book with pocket-sized book printing.

The bookbinding conditions may indicate that sheets of paper are bound into a book with pocket-sized book printing, for example, as disclosed in FIG. 11. In this case, examples of binding directions include left opening, right opening, upward opening, and downward opening. FIG. 11 is a view illustrating an example in which two pages are included in a sheet in the case of pocket-sized book printing. Pages laid out on each sheet are arranged so as to align the pages in order at the time of binding sheets into a book with the pocket-sized book printing. The size of bitmaps on the top face, the bottom face, and the front side face is different from that in FIG. 4 because two pages are included in a sheet.

Figure 12:
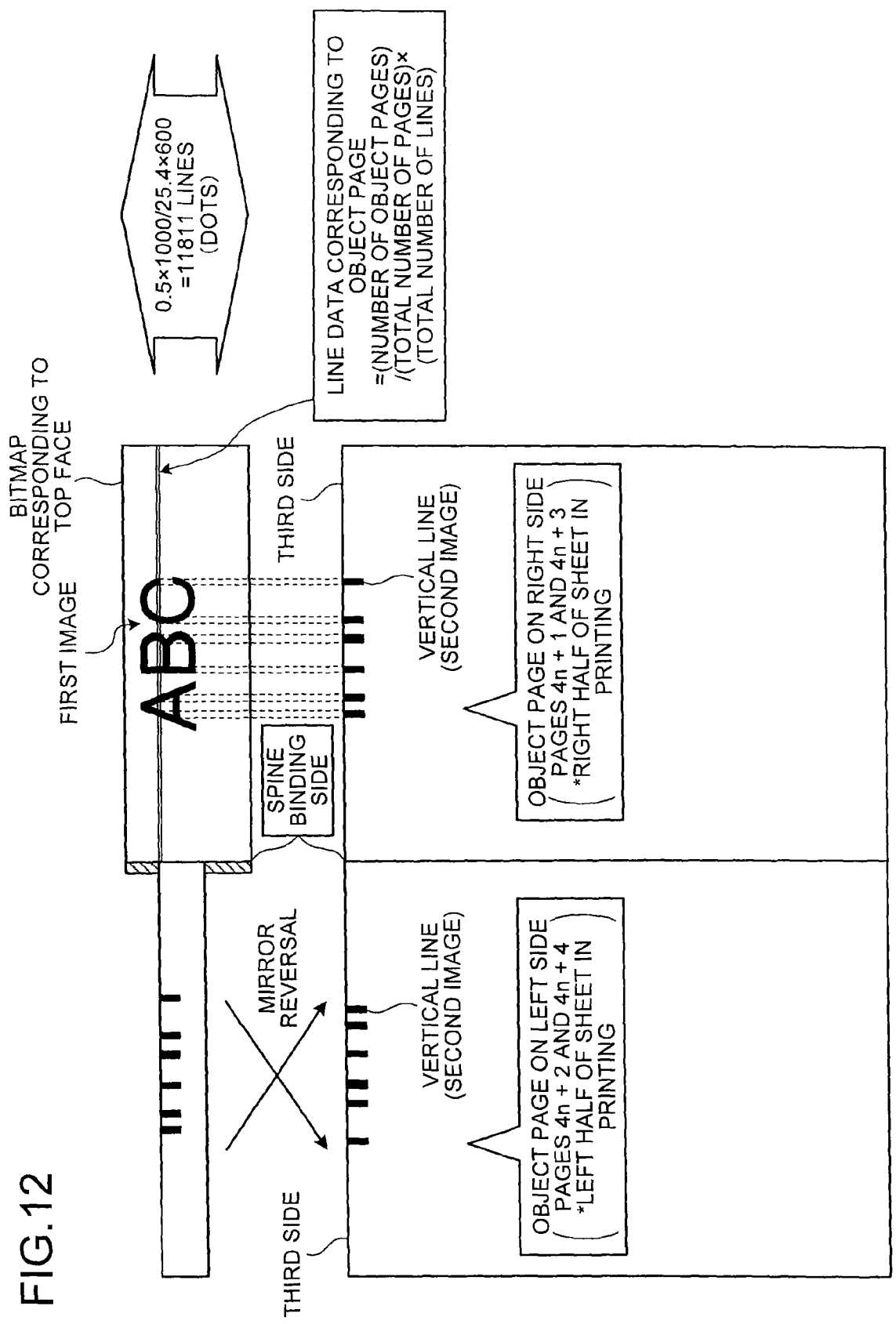
FIG. 12 is a schematic view illustrating a state in which second images are added to dot positions on object pages.

FIG. 12 illustrates the case where the bookbinding conditions indicate that sheets of paper are bound into a book with the pocket-sized book printing, and is a schematic view illustrating a state in which the second images of vertical lines are added to dot positions on the third sides of object pages when the first image of a character string "ABC" is rendered on the bitmap corresponding to the top face designated by the designating unit 113. As illustrated in FIG. 12, the position relation between the dot positions on the third sides of the object pages (pages 4n+1 and 4n+3, n≥0) on the right side assigned to the right half of a sheet and the dot positions on the third sides of the object pages (pages 4n+2 and 4n+4, n≥0) on the left side assigned to the left half of the sheet is a position relation where left and right are reversed (relation of a mirror position).

Figure 13:
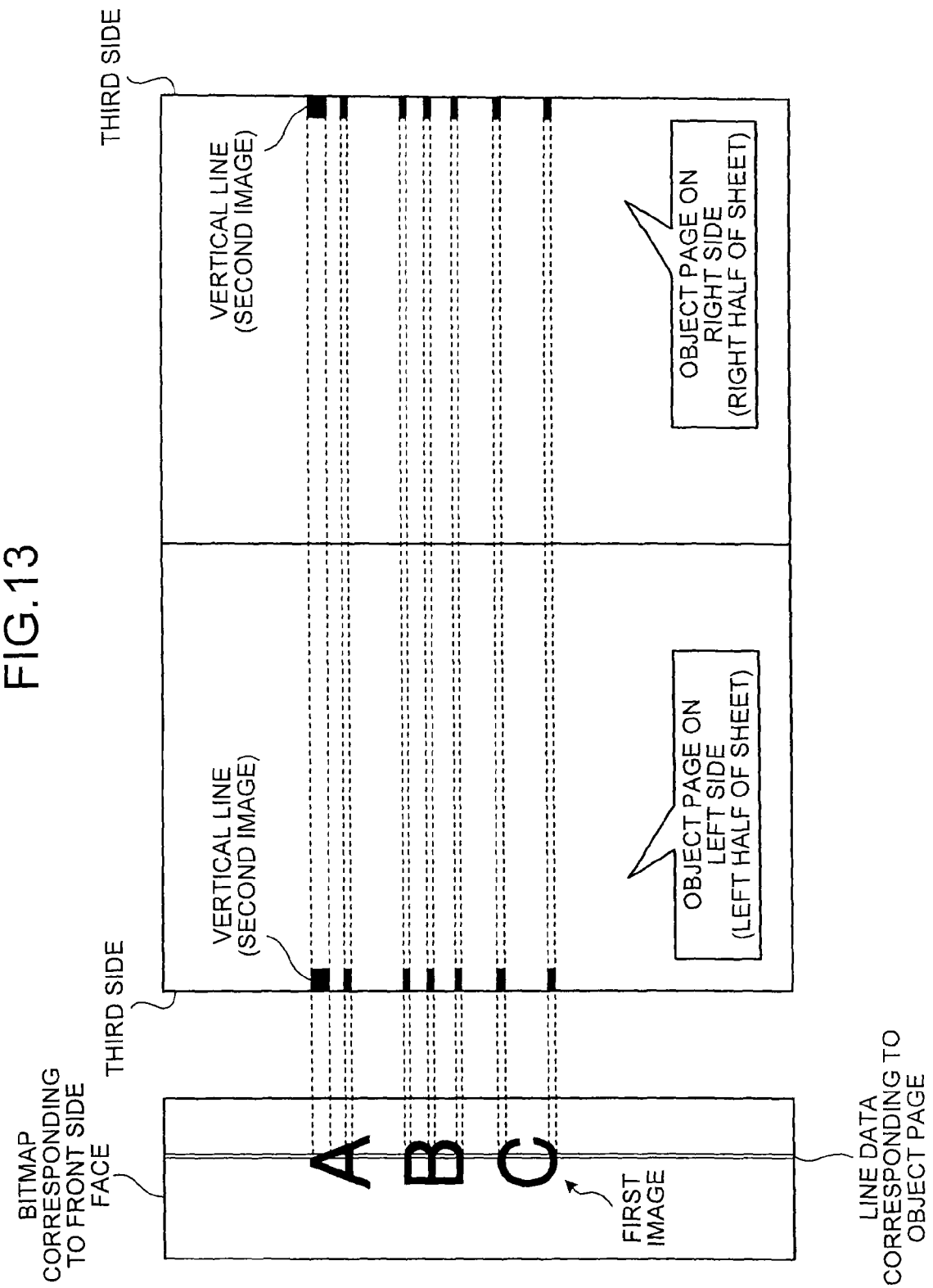
FIG. 13 is a schematic view illustrating a state in which second images are added to dot positions on object pages.

FIG. 13 illustrates the case where the bookbinding conditions indicate that sheets of paper are bound into a book with the pocket-sized book printing, and is a schematic view illustrating a state in which the second images of vertical lines are added to dot positions on the third sides of object pages when the first image of a character string "ABC" is rendered on the bitmap corresponding to the front side face designated by the designating unit 113. As illustrated in FIG. 13, the third side of the object page on the right side assigned to the right half of a sheet is a side (right side) opposite to the binding side of a page, and the second image of vertical lines is added to a place (dot position) corresponding to the dots of the first image included in the corresponding line data, whereas the third side of the object page on the left side assigned to the left half of the sheet is a side (left side) opposite to the binding side of the page, and the second image of vertical lines is added to the same position as the object page on the right side.

Figure 14:
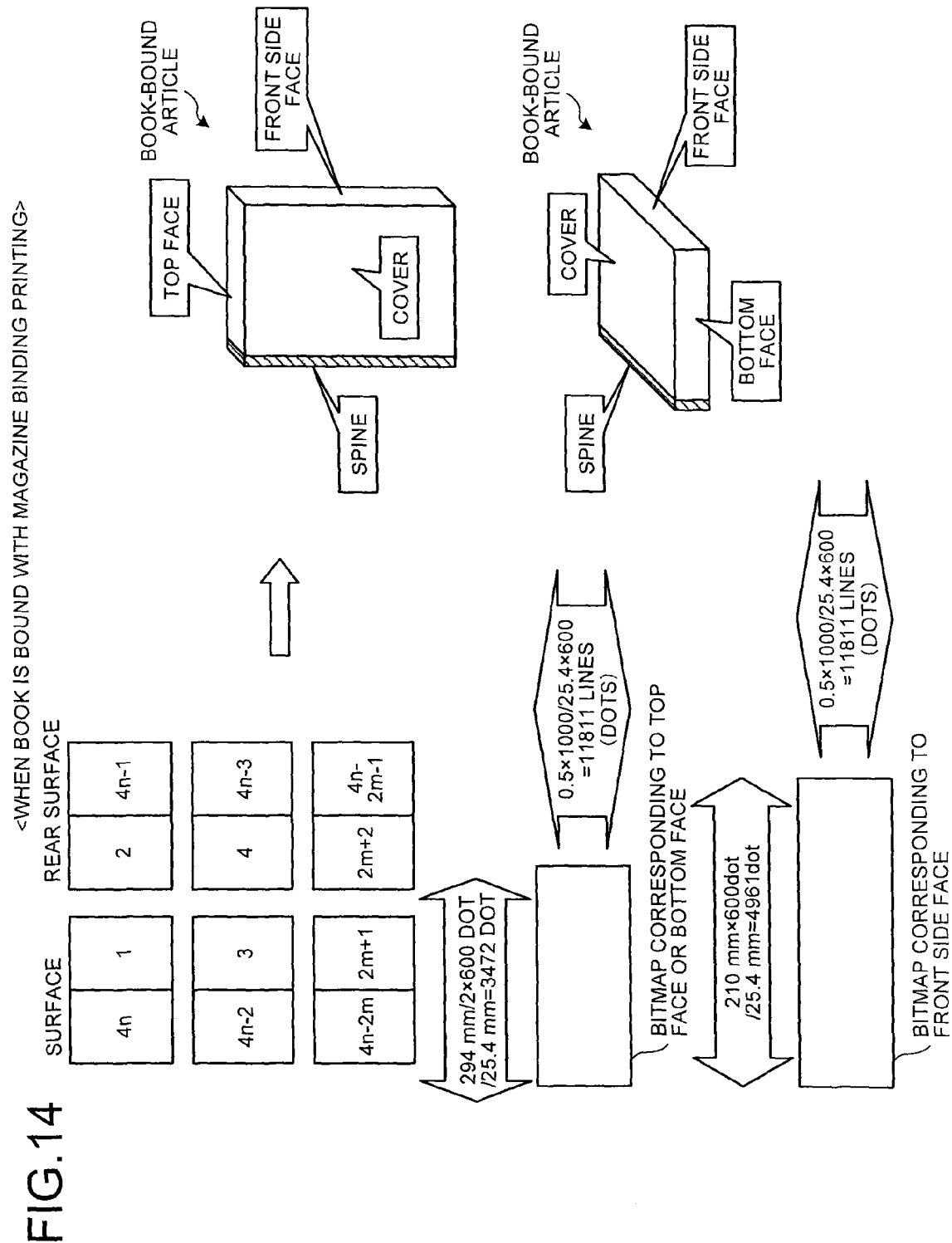
FIG. 14 is a view illustrating an example of the case where sheets of paper are bound into a book with magazine binding printing.

The bookbinding conditions may indicate that sheets of paper are bound into a book with magazine binding printing, for example, as illustrated in FIG. 14. In this case, examples of binding directions include left opening, right opening, upward opening, and downward opening. FIG. 14 is a view illustrating an example in which two pages are included in a sheet in the case of magazine binding printing. Pages laid out on each sheet are arranged so as to align the pages in order at the time of binding sheets into a book with the magazine binding printing. The size of bitmaps on the top face, the bottom face, and the front side face is different from that in FIG. 4 because two pages are included in a sheet.

Figure 15:
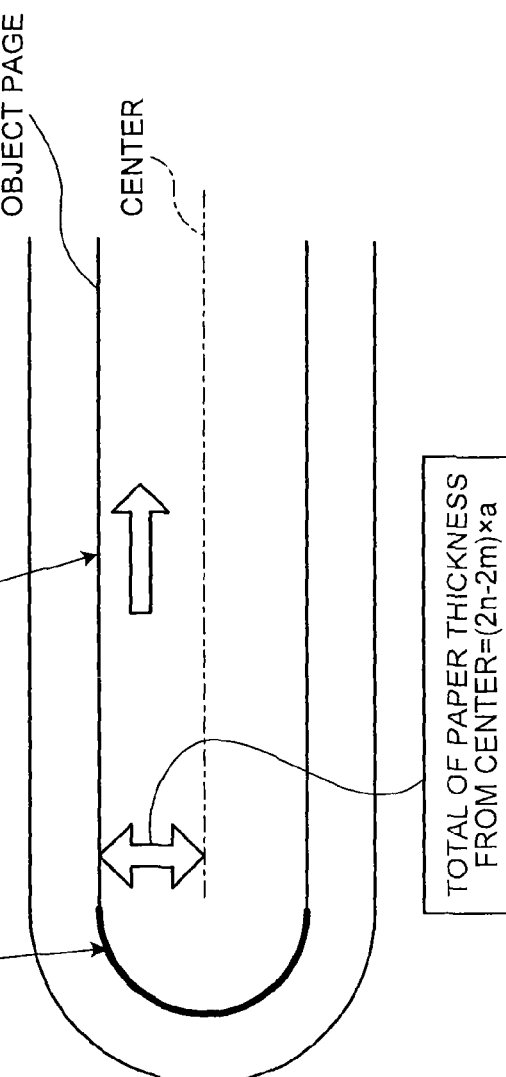
FIG. 15 is a view illustrating one example of table data for calculating a correction amount of a dot position on an object page.

When sheets of paper are bound into a book with the magazine binding printing, positional deviation of dots is caused due to paper thickness from the center to the object page in the paper thickness direction of a book-bound article. Therefore, it is preferable that the printer driver 110 have a function of correcting this positional deviation. In other words, it is preferable that the printer driver 110 further include a correcting unit for correcting a dot position on the third side of an object page depending on the paper thickness from the center to the object page in the paper thickness direction of a book-bound article. FIG. 15 is a view illustrating one example of table data for calculating a correction amount of a dot position on the third side of an object page (the correction amount for shifting in a direction opposite to the spine).

Figure 16:
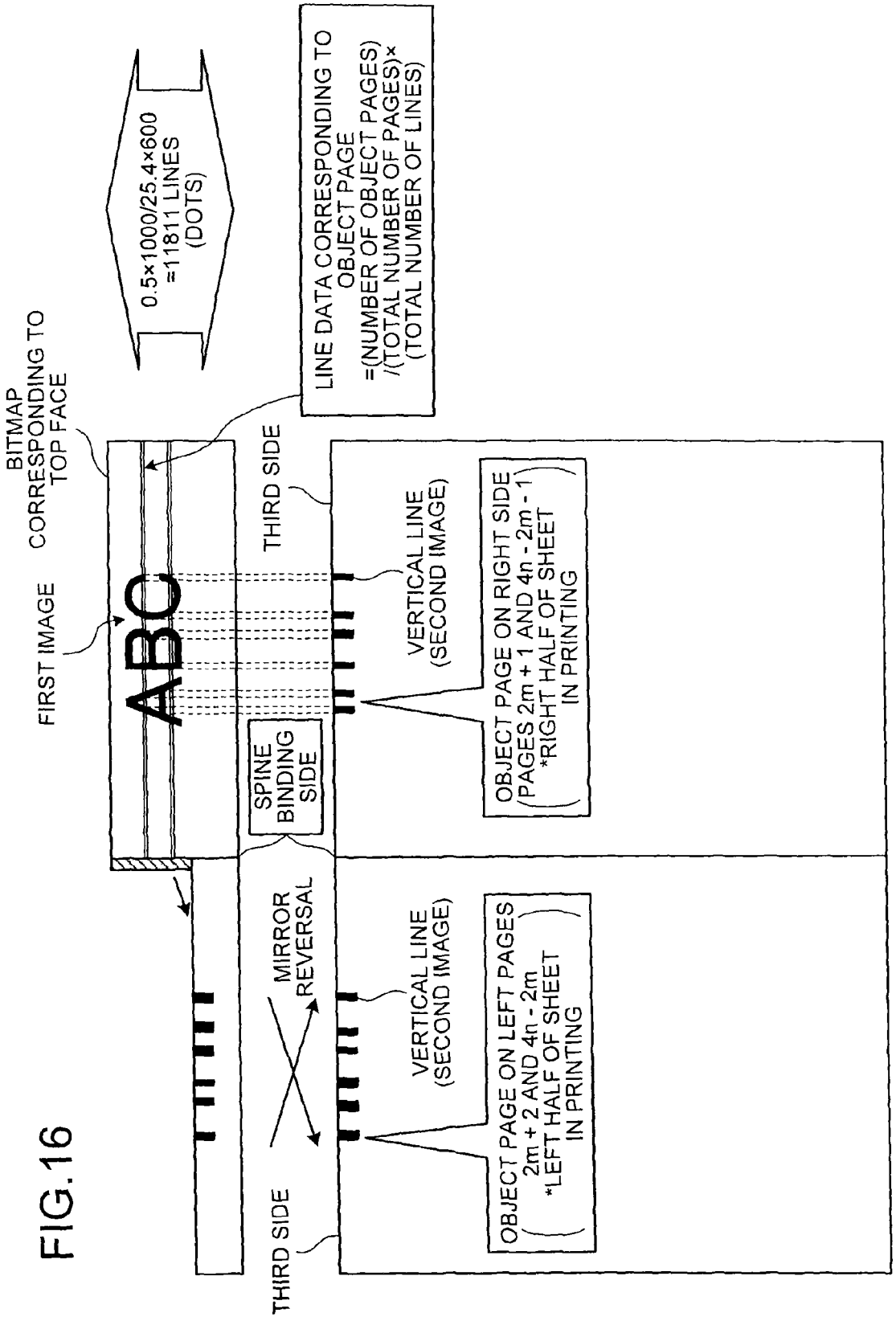
FIG. 16 is a schematic view illustrating a state in which second images are added to dot positions on object pages.

FIG. 16 illustrates the case where the bookbinding conditions indicate that sheets of paper are bound into a book with the magazine binding printing, and is a schematic view illustrating a state in which the second images of vertical lines are added to dot positions on the third sides of object pages when the first image of a character string "ABC" is rendered on the bitmap corresponding to the top face designated by the designating unit 113. This is basically the same as the case of the pocket-sized book printing except that line data corresponding to the left and right object pages are different because of the binding method.

Figure 17:
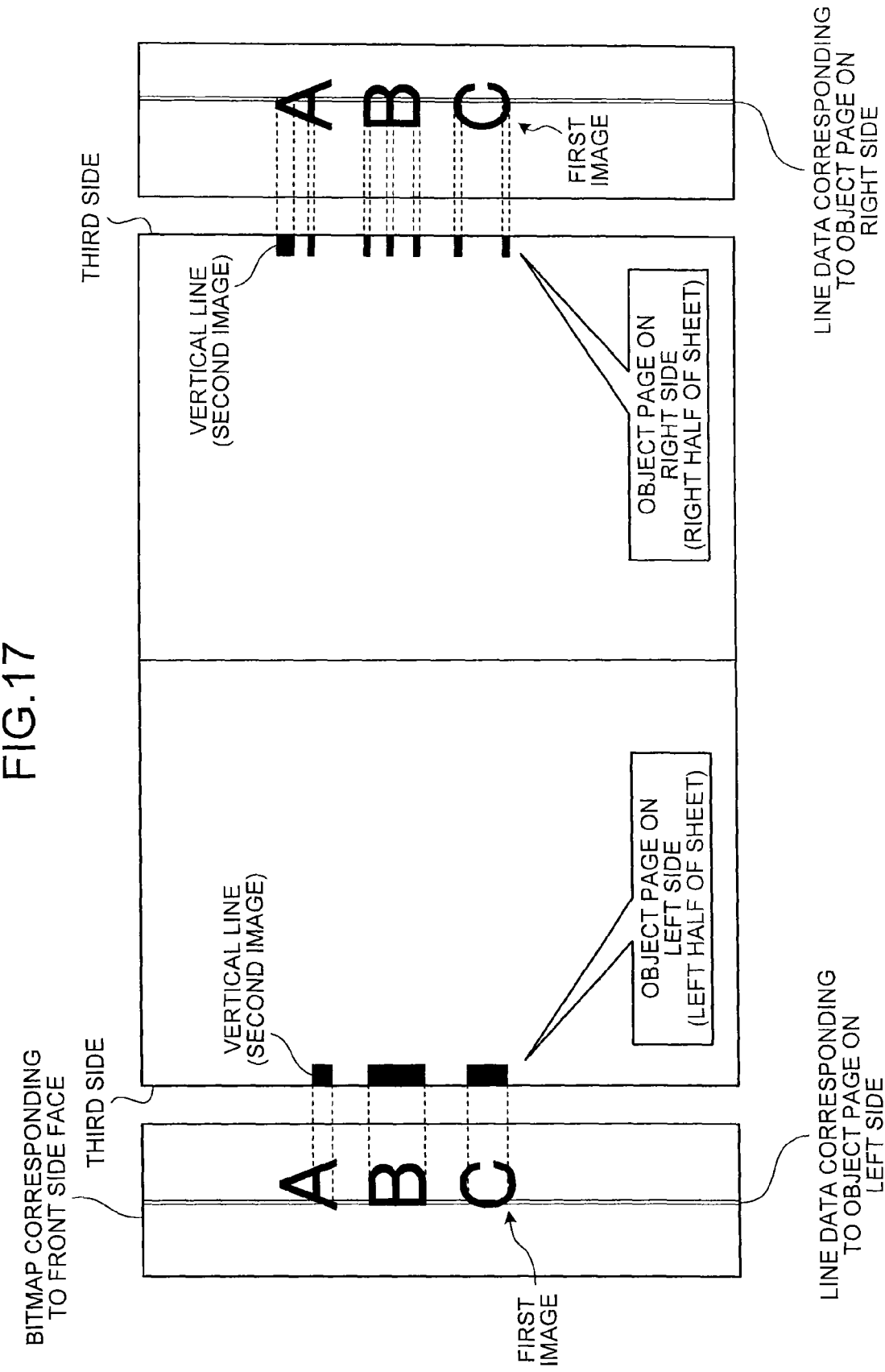
FIG. 17 is a schematic view illustrating a state in which second images are added to dot positions on object pages.

FIG. 17 illustrates the case where the bookbinding conditions indicate that sheets of paper are bound into a book with the magazine binding printing, and is a schematic view illustrating a state in which the second images of vertical lines are added to dot positions on the third sides of object pages when the first image of a character string "ABC" is rendered on the bitmap corresponding to the front side face designated by the designating unit 113. This is basically the same as the case of the pocket-sized book printing except that line data corresponding to the left and right object pages are different because of the binding method.

Figure 18:
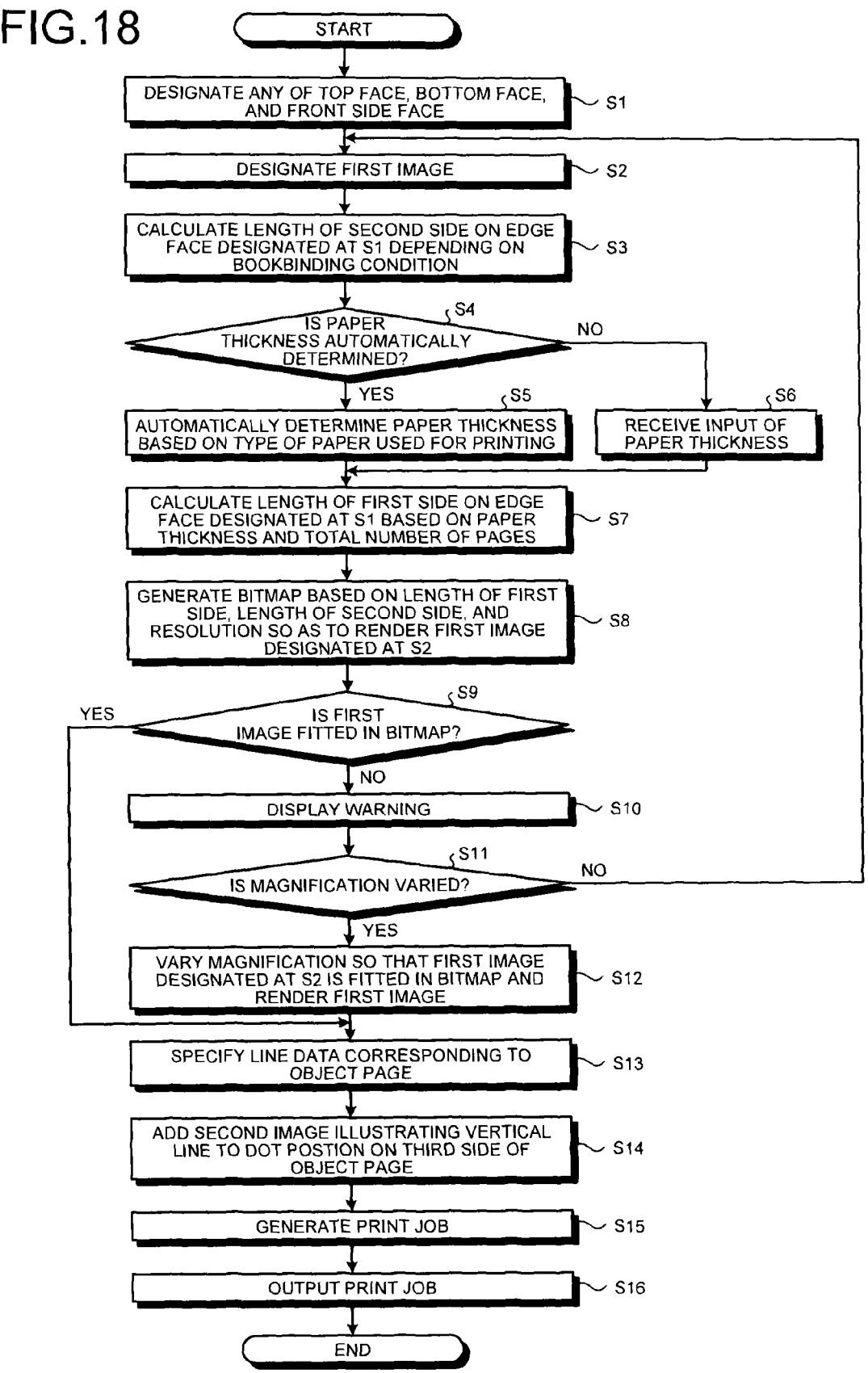
FIG. 18 is a flowchart illustrating an operation example of a printer driver.

The following describes an operation example of the printer driver 110 with reference to FIG. 18. FIG. 18 is a flowchart illustrating the operation example of the printer driver 110. It is assumed that the printer driver 110 has received the above-mentioned bookbinding printing information from the application 102 and has completed layout processing of the print data.

The designating unit 113 designates any of the top face, the bottom face, and the front side face of a book-bound article depending on input from a user (Step S1). Subsequently, the printer driver 110 (for example, the rendering unit 115) designates the first image to be printed on the edge face of the book-bound article designated at Step S1 depending on input from a user (Step S2). Then, the generating unit 114 calculates a length of the second side orthogonal to the first side, which is parallel to the paper thickness direction, on the edge face designated at Step S1 depending on the bookbinding conditions (such as a binding method for binding sheets into a book and a type of paper) (Step S3). If the generating unit 114 automatically determines the paper thickness (Yes at Step S4), the generating unit 114 automatically determines the paper thickness based on the type of paper used for printing (Step S5). If not (No at Step S4), the generating unit 114 receives input of the paper thickness from the user (Step S6).

Subsequently, the generating unit 114 calculates a length of the first side parallel to the paper thickness direction on the edge face designated at Step S1 based on the paper thickness and the total number of pages (Step S7). Then, the generating unit 114 generates a bitmap based on the length of the first side, the length of the second side, and the resolution, and renders the first image designated at Step S2 on the generated bitmap (Step S8). In the case of vertical writing, for example, the first image may be rotated by 90 degrees and rendered. Subsequently, the generating unit 114 determines whether the first image designated at Step S2 is fitted in the bitmap (Step S9). If the first image is not fitted in the bitmap (No at Step S9), the generating unit 114 displays warning (Step S10) and waits for input of designation for varying magnification (Step S11). If the generating unit 114 has received the input of designation for varying magnification (Yes at Step S11), the generating unit 114 varies the magnification so that the first image designated at Step S2 is fitted in the bitmap, and renders the first image (Step S12). If the generating unit 114 has not received the input of designation for varying magnification within a certain period of time (No at Step S11), the process returns to Step S2.

If the first image designated at Step S2 is fitted in the bitmap (Yes at Step S9) or after Step S12 is completed, the specifying unit 116 specifies, for each page to be printed (object page), line data corresponding to the page (Step S13). As described above, the specifying unit 116 specifies the line data corresponding to the object page based on the total number of pages, the number of object pages, and the total number of lines in the book-bound article (see Expression 1). Subsequently, the adding unit 117 adds the second image of vertical lines to a dot position on the third side (side corresponding to the specified line data) of the object page for each object page (Step S14). Subsequently, the output unit 118 generates a print job including the object page to which the second image is added at Step S14 (Step S15). Then, the output unit 118 outputs (transmits) the print job generated at Step S15 to the image processing device (Step S16). The image processing device having received this print job performs printing based on the print job so as to obtain a book-bound article depending on the bookbinding printing information.

As described above, the present embodiment enables a predetermined image (first image) to be printed on an edge face of a book-bound article without requiring special printers such as a silk-screen printer.

The computer program executed by the information processing device 10 may be recorded and provided as a file in installable format or in executable format in computer-readable recording media such as a compact disc read-only memory (CD-ROM), a flexible disk (FD), a compact disc recordable (CD-R), and a digital versatile disc (DVD).

Furthermore, the computer program executed by the information processing device 10 may be stored in a computer connected to a network such as the Internet and be downloaded via the network so as to be provided. In addition, the computer program executed by the information processing device 10 may be provided or distributed via a network such as the Internet.

The present invention enables a predetermined image to be printed on an edge face of a book-bound article without requiring special printers.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
   a designating unit that designates at least one of three edge faces other than an edge face corresponding to a spine of a book-bound article generated by a printer;
   a generating unit that generates a bitmap corresponding to the edge face designated by the designating unit depending on a bookbinding condition;
   a rendering unit that renders a first image designated by a user on the bitmap;
   a specifying unit that specifies, from among a plurality of pieces of line data that correspond on a one-to-one basis to a plurality of dots forming a first side parallel to a paper thickness direction and that each extend parallel to a second side orthogonal to the first side, in the bitmap, line data corresponding to an object page that indicates a page to be printed;
   an adding unit that adds a second image to a place that corresponds to the dots of the first image included in the specified line data, on a third side that indicates a side of the object page corresponding to the specified line data; and
   an output unit that outputs a print job including the object page to which the second image is added to the printer.

2. The information processing device according to claim 1, wherein the specifying unit specifies the line data corresponding to the object page based on the total number of pages, the number of the object pages, and the total number of pieces of the line data.

3. The information processing device according to claim 1, wherein the first image is a character string.

4. The information processing device according to claim 1, wherein the second image is a straight line extending in a direction orthogonal to the third side.

5. The information processing device according to claim 1, wherein the second image is a part of the first image below the specified line data.

6. The information processing device according to claim 1, wherein the bookbinding condition indicates that sheets of paper are bound into a book with single-sided printing.

7. The information processing device according to claim 1, wherein the bookbinding condition indicates that sheets of paper are bound into a book with duplex printing.

8. The information processing device according to claim 1, wherein the bookbinding condition indicates that sheets of paper are bound into a book with pocket-sized book printing.

9. The information processing device according to claim 1, wherein the bookbinding condition indicates that sheets of paper are bound into a book with magazine binding printing.

10. The information processing device according to claim 9, further comprising
    a correcting unit that corrects a position corresponding to the dots of the first image included in the line data on the third side of the object page depending on a paper thickness from center to the object page in a paper thickness direction of the book-bound article.

11. An information processing method comprising:
    designating at least one of three edge faces other than an edge face corresponding to a spine of a book-bound article generated by a printer;
    generating a bitmap corresponding to the edge face designated at the designating depending on a bookbinding condition;
    rendering a first image designated by a user on the bitmap;
    specifying, from among a plurality of pieces of line data that correspond on a one-to-one basis to a plurality of dots forming a first side parallel to a paper thickness direction and that each extend parallel to a second side orthogonal to the first side, in the bitmap, line data corresponding to an object page that indicates a page to be printed;
    adding a second image to a place that corresponds to the dots of the first image included in the specified line data, on a third side that indicates a side of the object page corresponding to the specified line data; and
    outputting a print job including the object page to which the second image is added to the printer.

12. A computer program product comprising a non-transitory computer-readable medium containing a computer program that causes a computer to execute:
    designating at least one of three edge faces other than an edge face corresponding to a spine of a book-bound article generated by a printer;
    generating a bitmap corresponding to the edge face designated at the designating depending on a bookbinding condition;
    rendering a first image designated by a user on the bitmap;
    specifying, from among a plurality of pieces of line data that correspond on a one-to-one basis to a plurality of dots forming a first side parallel to a paper thickness direction and that each extend parallel to a second side orthogonal to the first side, in the bitmap, line data corresponding to an object page that indicates a page to be printed;
    adding a second image to a place that corresponds to the dots of the first image included in the specified line data, on a third side that indicates a side of the object page corresponding to the specified line data; and
    outputting a print job including the object page to which the second image is added to the printer.

* * * * *